United States Patent
Martini et al.

(10) Patent No.: US 8,619,598 B2
(45) Date of Patent: Dec. 31, 2013

(54) PSEUDOWIRE STATUS MAINTENANCE FOR STATIC PSEUDOWIRES

(75) Inventors: Luca Martini, Lakewood, CO (US); George Swallow, Boston, MA (US)

(73) Assignee: Cisco Technology, Inc., San Jose, CA (US)

( * ) Notice: Subject to any disclaimer, the term of this patent is extended or adjusted under 35 U.S.C. 154(b) by 930 days.

(21) Appl. No.: 12/657,676

(22) Filed: Jan. 25, 2010

(65) Prior Publication Data

US 2011/0182189 A1   Jul. 28, 2011

(51) Int. Cl.
*H04B 7/212* (2006.01)
*H04L 12/50* (2006.01)
*G06F 15/177* (2006.01)

(52) U.S. Cl.
USPC ........... 370/249; 370/231; 370/247; 370/248; 370/358; 370/395.2; 709/220; 709/224

(58) Field of Classification Search
USPC ......... 370/230, 231, 242, 244, 248, 249, 251, 370/253, 258, 384, 385, 395.2, 395.21, 370/395.3, 396, 397, 399, 409; 709/222, 709/231, 232, 233, 234, 235, 220, 224
See application file for complete search history.

(56) References Cited

U.S. PATENT DOCUMENTS

| | | | |
|---|---|---|---|
| 2008/0175234 A1* | 7/2008 | Li | 370/389 |
| 2008/0240101 A1* | 10/2008 | Shao et al. | 370/392 |
| 2008/0253381 A1* | 10/2008 | Ward et al. | 370/396 |
| 2008/0285466 A1* | 11/2008 | Salam et al. | 370/241.1 |
| 2009/0327797 A1* | 12/2009 | Wei | 714/2 |
| 2010/0238791 A1* | 9/2010 | Duncan et al. | 370/216 |

OTHER PUBLICATIONS

"Pseudowire Status for Static Pseudowires", IETF draft-martini-pwe3-static-pw-status-02.txt, L. Martini et al., Oct. 24, 2009.
"Pseudowire Setup and Maintenance Using the Label Distribution Protocol (LDP)", RFC 4447, L. Martini et al., Apr. 2006.

* cited by examiner

*Primary Examiner* — Awet Haile
(74) *Attorney, Agent, or Firm* — Cindy Kaplan

(57) ABSTRACT

In one embodiment, a method includes generating an aggregated pseudowire status message at a first network device in a Multi-Protocol Label Switching (MPLS) network, transmitting the aggregated pseudowire status message to a second network device on a Label Switched Path (LSP) extending between the first and second network devices in the MPLS network, and establishing at the first network device, an aggregated pseudowire status session with the second network device upon receiving a response to the aggregated pseudowire status message on the LSP. The aggregated pseudowire status message configured to verify a current status of pseudowires on the LSP. An apparatus is also disclosed.

15 Claims, 3 Drawing Sheets

PSEUDOWIRE STATUS MAINTENANCE FOR STATIC PSEUDOWIRES

BACKGROUND

The present disclosure relates generally to communications networks, and more particularly, to pseudowire technology.

A pseudowire may be used to transfer data across a packet switched network, such as a Multi-Protocol Label Switching (MPLS) network. In some MPLS networks (e.g., networks utilizing Multi-Protocol Label Switching-Transport Profile (MPLS-TP)), the networks are provisioned and maintained without a dynamic control plane and everything is statically provisioned. When pseudowires are statically provisioned, pseudowire status may be communicated via OAM (Operation, Administration, and Maintenance) messages in a control channel associated with the pseudowire. However, there is no control protocol session to maintain the state of the pseudowires.

BRIEF DESCRIPTION OF THE DRAWINGS

Corresponding reference characters indicate corresponding parts throughout the several views of the drawings.

DESCRIPTION OF EXAMPLE EMBODIMENTS

Overview

Figure 1:
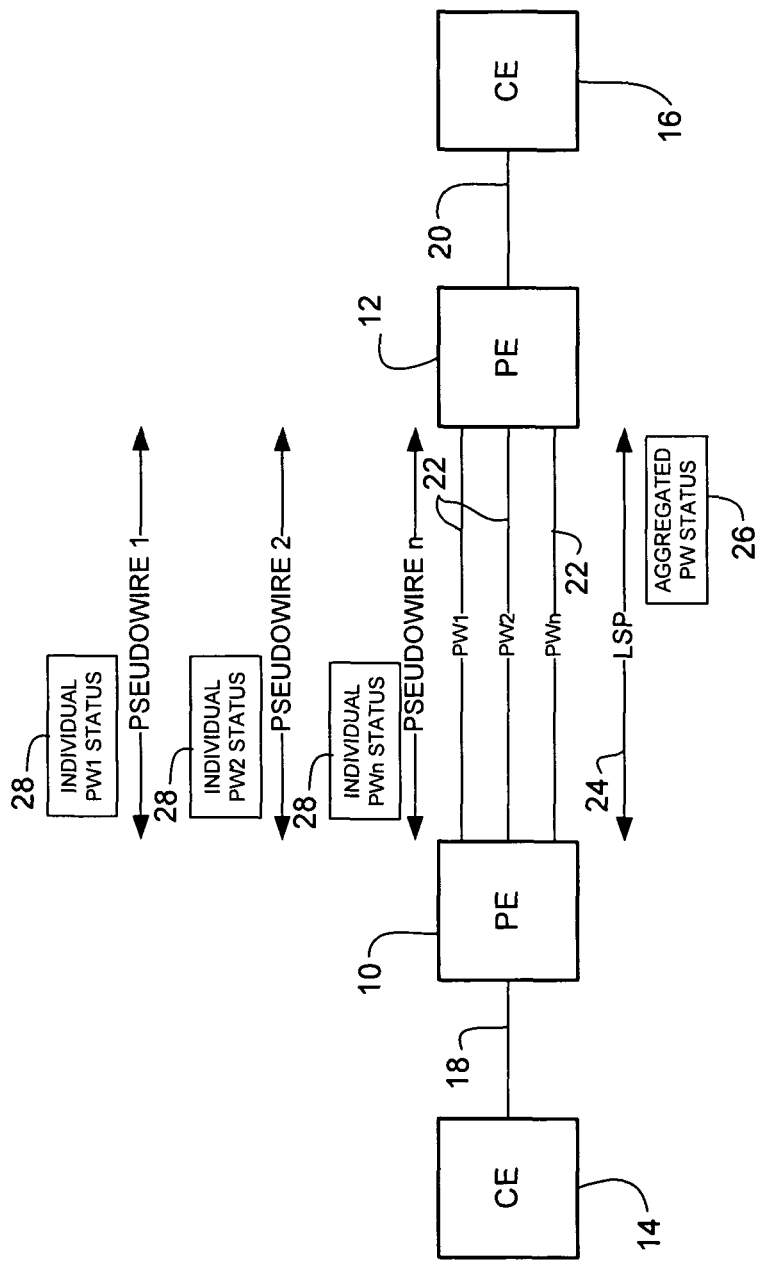
FIG. 1 illustrates an example of a network in which embodiments described herein may be implemented.

In one embodiment, a method generally comprises generating an aggregated pseudowire status message at a first network device in a Multi-Protocol Label Switching (MPLS) network, transmitting the aggregated pseudowire status message to a second network device on a Label Switched Path (LSP) extending between the first and second network devices in the MPLS network, and establishing at the first network device, an aggregated pseudowire status session with the second network device upon receiving a response to the aggregated pseudowire status message on the LSP. The aggregated pseudowire status message configured to verify a current status of pseudowires on the LSP.

In another embodiment, an apparatus generally comprises a processor for generating an aggregated pseudowire status message, transmitting the aggregated pseudowire status message on a Label Switched Path (LSP) in a Multi-Protocol Label Switching (MPLS) network, and establishing an aggregated pseudowire status session upon receiving a response to the aggregated pseudowire status message on the LSP. The aggregated pseudowire status message configured to verify a current status of pseudowires on the LSP. The apparatus further includes memory for storing the status of the pseudowires.

Example Embodiments

The following description is presented to enable one of ordinary skill in the art to make and use the embodiments. Descriptions of specific embodiments and applications are provided only as examples, and various modifications will be readily apparent to those skilled in the art. The general principles described herein may be applied to other embodiments and applications without departing from the scope of the invention. Thus, the invention is not to be limited to the embodiments shown, but is to be accorded the widest scope consistent with the principles and features described herein. For purpose of clarity, details relating to technical material that is known in the technical fields related to the embodiments have not been described in detail.

A pseudowire (PW) is an emulated circuit across a Packet Switched Network (PSN). Functions provided by a pseudowire include encapsulating bit streams, cells, or PDUs arriving at an ingress port and carrying them across a path or tunnel, and other operations required to emulate the behavior and characteristics of a particular service. The PSN may be a Multi-Protocol Label Switching (MPLS) network, for example. In an MPLS network, packets are assigned labels by Label Switching Routers (LSRs) and forwarded along a Label Switched Path (LSP). Multiple pseudowires may share the same LSP.

A simplified version of MPLS for transport networks is referred to as Multi-Protocol Label Switching-Transport Profile (MPLS-TP). MPLS-TP provides technology enhancements to existing MPLS standards to extend the definition of MPLS to include support for traditional transport operational models. MPLS-TP advocates provisioning and maintaining a network without a dynamic control plane. When pseudowires are statically provisioned, pseudowire status may be communicated in a channel associated with that pseudowire. However, there is no control protocol session analogous to the one maintained by Label Distribution Protocol (LDP) to verify the state of the pseudowires. Conventional MPLS-TP networks thus require that pseudowire status messages are not only sent, but continually refreshed on each associated pseudowire channel. This scales poorly, since each pseudowire status message needs to be individually refreshed.

The embodiments described herein provide a channel in an LSP that may be used to maintain pseudowire status for multiple pseudowires between pseudowire endpoints or midpoints, where the pseudowires (or multi-segment pseudowires (MS-PWs)) are directly connected across the LSP. A single refresh session is used on the LSP to indicate state liveliness for all pseudowires routed across that LSP. The use of a single session for an unlimited number of pseudowires on a particular LSP greatly improves scaling of the pseudowires.

Referring now to the drawings, and first to FIG. 1, an example of a network in which the embodiments described herein may be implemented is shown. The embodiments operate in the context of a data communications network including multiple nodes. Some of the nodes in a network that employs the embodiments may be network devices such as routers, gateways, or switches. In one embodiment, the network device may be implemented as shown in the block diagram of FIG. 3 and described below.

In the example shown in FIG. 1, a network (e.g., service provider network) includes peripherally located Provider Edge (PE) devices (e.g., routers) 10, 12, each of which is connected to a Customer Edge (CE) device (e.g., router) 14, 16. The PE devices 10, 12 are used to maintain routing and forwarding context for each customer. The CE devices 14, 16 may couple private LANs (not shown) associated with one or more customers, for example. The PE devices 10, 12 are connected to the CE devices 14, 16 via attachment circuits 18, 20.

The path between PE devices 10, 12 may also include Provider (P) routers. An LSP can traverse any number (0 or more) P routers. The status maintenance session described herein is from one PE to another PE across the LSP, with status maintenance packets switched on the routers along the LSP.

In one embodiment the service provider network is an MPLS network, which may operate in accordance with MPLS-TP. The MPLS network comprises a plurality of pseudowires (PW1, PW2, . . . PWn) 22. One or more of the pseudowires may be a multi-segment pseudowire (MS-PW). The pseudowires share the same LSP 24.

A packet (frame, PDU) traverses the network environment beginning at a first CE router (e.g., CE device 14) and ending up at a second CE router (e.g., CE device 16). The first CE router 14 sends a packet to an ingress PE router (e.g., PE device 10). The ingress PE router 10 receives the packet and encapsulates the packet with MPLS labels, which are used to identify the individual port/circuit and the egress PE router (e.g., PE device 12). The ingress PE 10 may put the packet in a two-level MPLS stack, for example. The top label is used to tunnel packets to the egress PE 12 to accomplish MPLS forwarding through the core network. The bottom label is used by the egress PE 12 to identify the outgoing route for the packet. The encapsulated packet is forwarded on one of the PWs 22, across the PSN, to the egress PE router 12. The egress PE router 12 removes the MPLS label that identifies the port/circuit and was added by the ingress PE router 10, and forwards the packet to the second CE router 16.

Each pseudowire 22 provides pseudowire status based on the exchange of packets 28 between endpoints (PE devices 10, 12) or midpoints (referred to as S-PE (switching point PE) (not shown). Since these messages 28 are transmitted individually for each pseudowire, they are referred to herein as 'individual pseudowire status' messages. The individual pseudowire status packets 28 may be transmitted along each pseudowire 22 in a pseudowire OAM status message using a pseudowire associated channel. In one embodiment, the individual pseudowire status messages 28 correspond to a pseudowire status message described in Pseudowire Status for Static Pseudowires, IETF draft-martini-pwe3-static-pw-status-02.txt, L. Martini et al., Oct. 24, 2009, which is incorporated herein by reference. In the embodiments described herein, the individual pseudowire status messages 28 are simply acknowledged and not normally refreshed.

As described in detail below, the LSP 24 includes a channel that maintains pseudowire status for the multiple pseudowires 22 operating on the LSP by transmitting pseudowire OAM status messages (also referred to as 'keepalive' messages) 26. The pseudowire OAM status message 26 transmitted on the LSP provides status for multiple pseudowires and is therefore referred to herein as an 'aggregated pseudowire OAM status message' (or 'aggregated pseudowire status message'). In one embodiment, the message 26 is transmitted on an associated control channel on the LSP 24. Details of the aggregated pseudowire status message 26 are described below.

It is to be understood that the network shown in FIG. 1 is only an example, and that the embodiments described herein may be implemented in networks having different network devices or topologies. For example, the provider network may include any number of PE devices connected with any number of pseudowires or MS-PWs, and the PEs may be connected to any number of CE devices via any number of attachment circuits. Also, there may be intermediate (midpoint) devices interposed between the PE devices 10, 12.

Figure 2:
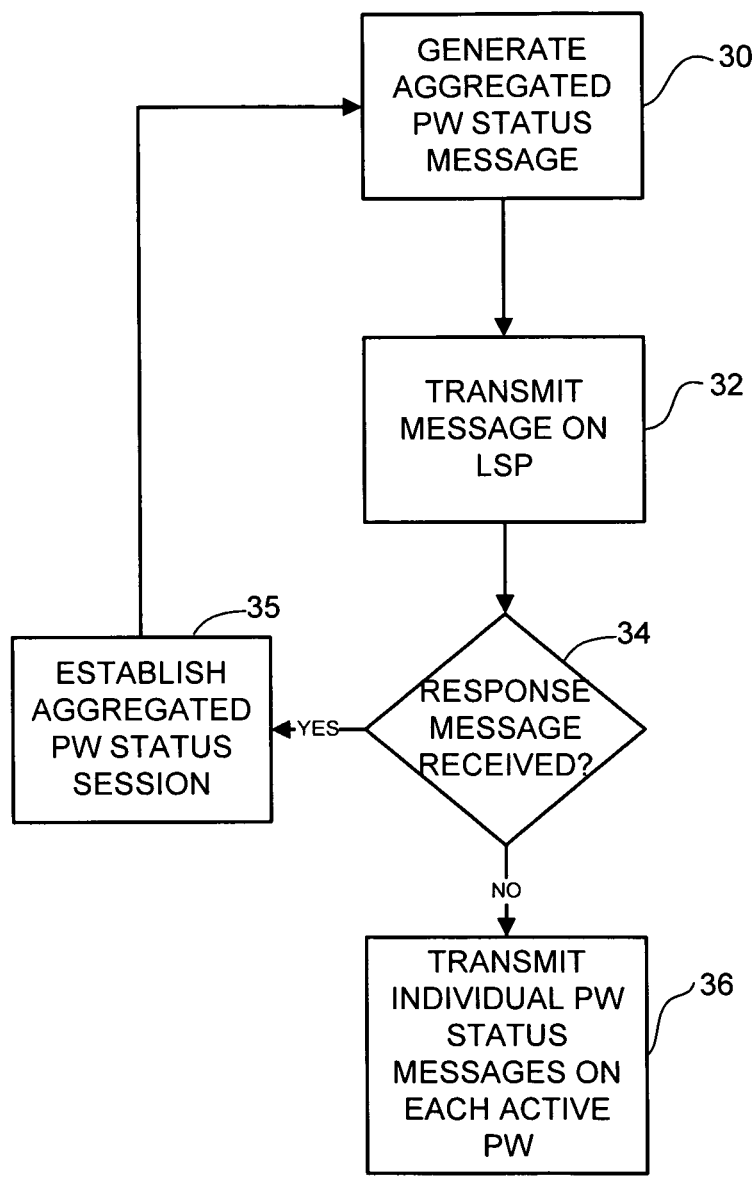
FIG. 2 is a flowchart illustrating an overview of a process for maintaining status for static pseudowires, in accordance with one embodiment.

FIG. 2 is a flowchart illustrating an overview of a process for maintaining pseudowire status for static pseudowires, in accordance with one embodiment. At step 30, a first PE device generates an aggregated pseudowire status message 26. Step 30 may be initiated when a first pseudowire 22 is configured on the LSP 24, the LSP is created, or when the LSP goes down and comes back up, for example. The aggregated pseudowire status message 26 is configured to verify a current status of the pseudowires routed across the LSP 24. The aggregated pseudowire status message may include, for example, a list of pseudowires for which the session verifies the current status. The pseudowire status information contained in the message 26 may be based on information received within individual pseudowire status messages 28, for example. The first PE device transmits the aggregated pseudowire status message 26 to a second PE device at the other end of the LSP (step 32). If a response to the message 26 is received within a predefined time interval, an aggregated pseudowire session is established between the two PE devices 10, 12 (steps 34 and 35). The first PE device will then generate aggregated pseudowire status messages 26 at periodic intervals (step 30). Once the aggregated pseudowire status session is established, and as long as the session is active (i.e., response messages are received), individual pseudowire status messages 28 are only transmitted on the pseudowire if there is a change in pseudowire status. If a response to the message 26 is not received within the predefined time interval, each of the active pseudowires 22 will be refreshed using the individual pseudowire messages 28 (steps 34 and 36) transmitted over each pseudowire. Each of the PE devices 10, 12 preferably generates and transmits its own aggregated pseudowire status messages 26, and responds to the other PE's status messages.

It is to be understood that the process illustrated in the flowchart of FIG. 2 and described above is only an example and that steps may be added or removed, without departing from the scope of the embodiments.

As described above, the embodiments provide an aggregated pseudowire status message 26 that is transmitted on the LSP 24 to maintain status of multiple pseudowires 22 on the LSP. This eliminates the need to refresh multiple individual pseudowire status messages 28 on each pseudowire 22. Therefore, only one refresh session is maintained for all pseudowires on a particular LSP, instead of one session per pseudowire. The individual pseudowire status message 28 is transmitted on the pseudowire 22 when the pseudowire is first configured. This message 28 is only acknowledged and is not normally refreshed. The status information provided in the individual pseudowire status message 28 is then used to generate the aggregated pseudowire status message 26. Once the aggregated pseudowire status session is established, the individual pseudowire status messages 28 are only sent if the pseudowire status changes or the aggregated pseudowire status session goes down (i.e., no response message received).

The aggregated pseudowire status messages 26 are used to determine the health of the pseudowire status engine, to protect against an accidental crash and reboot, and to communicate the set of pseudowires 22 which are being refreshed by the pseudowire status engine. The associated channel on the LSP 24 is not used to communicate specific pseudowire state information, but is instead used to setup a simple keepalive session without using any control protocols. The aggregated pseudowire status session is not a full control plane session, but rather a pseudowire maintenance engine keepalive, and no information specific to a particular pseudowire is sent over this session. The actual pseudowire status is sent in-band of the pseudowire on each of the pseudowires 22 using the individual pseudowire status messages 28. For example, specific pseudowire status information may be sent over a pseudowire associated channel as described in Martini et al., referenced above.

If the aggregated pseudowire status message 26 times out, the per pseudowire refresh process is restarted for each pseudowire 22 that has a non zero status (i.e., active pseudowires). The individual pseudowire status messages 28 are sent for each pseudowire associated channel and refreshed until a new aggregated pseudowire status session is established at the LSP level. At that point, the PE device 10, 12 sends an individual pseudowire status message 28 on each of the pseudowire associated channels with a refresh timer value of 0. If the individual pseudowire status message 28 is acknowledged once, no further messages are sent on the pseudowires 22 until the pseudowire has a new status state or the aggregated pseudowire status session (keepalive master session) times out.

The following is an example of fields contained within the aggregated pseudowire status message 26, in accordance with one embodiment:

Associated Channel Header (ACH) with codepoint PW keepalive (Identifies PW keepalive OAM message);
PW Keepalive Message PE Address (MPLS (or MPLS-TP) ID of node transmitting message);
Refresh Timer Value (Time between refresh messages);
TLVs
Session ID (Pseudo-random number used for graceful restart);
Ack-Session ID (Acknowledgement of received session ID);
PW ID (Identify add/delete of a PW); and
Ack PW ID (Acknowledge add/delete of a PW).

The PW ID and ack PW ID may be included as PWs are configured or deconfigured. It is to be understood that the above fields are only examples, and different fields may be used in the aggregated pseudowire status message 26 without departing from the scope of the embodiments.

Figure 3:
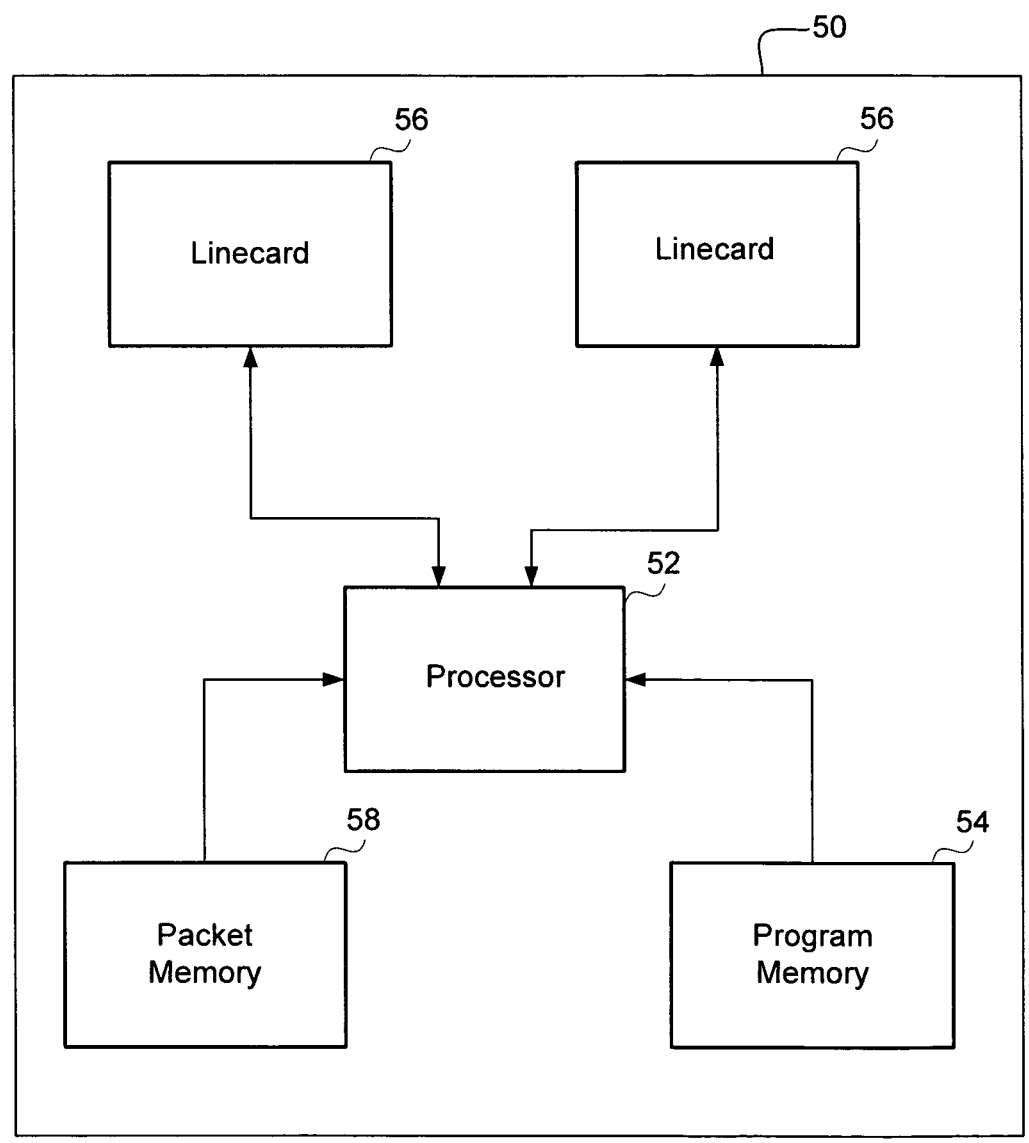
FIG. 3 is a block diagram illustrating an example of a network device useful in implementing embodiments described herein.

FIG. 3 depicts a network device 50 (e.g., provider edge device 10, 12) that may be used to implement embodiments described herein. The network device 50 may include, for example, a processor (e.g., central processing unit (CPU), multiple processors) 52, program memory 54, linecards (network interfaces) 56, and packet memory 58. When acting under the control of appropriate software or firmware, the processor 52 is responsible for such tasks as forwarding table computations, network management, and general processing of packets. It preferably accomplishes all of these functions under the control of software including an operating system and any appropriate applications software. Network device 50 is configured to implement all of the network protocols and extensions thereof described herein. In one embodiment, the network device 50 is a programmable machine that may be implemented in hardware, software, or any combination thereof. Logic may be encoded in one or more tangible media for execution by the processor 52. For example, the processor 52 may execute codes stored in the program memory 54. Program memory is one example of a computer-readable medium. Program memory 54 may be a volatile memory. Another form of computer-readable medium storing the codes is a type of non-volatile storage such as floppy disks, CD-ROMs, DVD-ROMs, hard disks, flash memory, etc. The memory may be used to store the status of the pseudowires.

Network device 50 interfaces with physical media via a plurality of linecards 56. The linecards 56 may include Ethernet interfaces, DSL interfaces, Gigabit Ethernet interfaces, 10-Gigabit Ethernet interfaces, SONET interfaces, etc. Some of the linecards 56 may interface with customer edge routers while others may act as interfaces into the packet-switched network. The linecards 56 may also implement virtual interfaces. The pseudowires and attachment circuits may be hosted on the linecards 56. The linecards 56 may incorporate processing and memory resources similar to those discussed above in connection with the network device as a whole. As packets are received, processed, and forwarded by the network device 50, they may be stored in packet memory 58. It is to be understood that the network device 50 shown in FIG. 3 and described herein is only one example and that different configurations of network devices may be used.

As can be observed from the foregoing, the embodiments described herein provide numerous advantages. For example, the embodiments provide pseudowire status for an unlimited number of pseudowires using a particular LSP, which greatly improves scalability.

Although the method and apparatus have been described in accordance with the embodiments shown, one of ordinary skill in the art will readily recognize that there could be variations made to the embodiments without departing from the scope of the invention. Accordingly, it is intended that all matter contained in the above description and shown in the accompanying drawings shall be interpreted as illustrative and not in a limiting sense.

What is claimed is:

1. A method comprising:
   generating an aggregated pseudowire status message at a first network device in a Multi-Protocol Label Switching Transport Profile (MPLS-TP) network;
   transmitting said aggregated pseudowire status message to a second network device on a Label Switched Path (LSP) extending between the first and second network devices in the MPLS-TP network, said aggregated pseudowire status message configured to verify a current status of pseudowires on the LSP;
   establishing at the first network device, an aggregated pseudowire status session with the second network device upon receiving a response to said aggregated pseudowire status message on the LSP; and
   transmitting an individual pseudowire status message on each of the pseudowires on the LSP, when said response is not received at the first network device within a predefined interval.

2. The method of claim 1 wherein while said aggregated pseudowire status session is active, said individual pseudowire status message is only transmitted once on said each of the pseudowires on the LSP following a change in the current status of the pseudowires on the LSP.

3. The method of claim 1 wherein said aggregated pseudowire status message comprises a list of pseudowires for which said aggregated pseudowire status session verifies said current status.

4. The method of claim 1 wherein transmitting said aggregated pseudowire status message comprises transmitting said aggregated pseudowire status message at periodic intervals while said aggregated pseudowire status session is active.

5. The method of claim 1 wherein said aggregated pseudowire status message comprises a session identifier and a refresh timer value.

6. The method of claim 1 wherein said current status of the pseudowires on the LSP comprises a list of pseudowires added to or removed from the LSP.

7. An apparatus comprising:
   a processor for generating an aggregated pseudowire status message, transmitting said aggregated pseudowire status message on a Label Switched Path (LSP) in a Multi-Protocol Label Switching Transport Profile (MPLS-TP) network, establishing an aggregated pseudowire status session upon receiving a response to said aggregated pseudowire status message on the LSP, said aggregated pseudowire status message configured to verify a current status of pseudowires on the LSP, and transmitting an individual pseudowire status message on each of the pseudowires on the LSP, when said response is not received within a predefined interval; and memory for storing said current status of the pseudowires on the LSP.

8. The apparatus of claim 7 wherein the processor is configured such that while said aggregated pseudowire status session is active, said individual pseudowire status message is only transmitted once on said each of the pseudowires on the LSP following a change in the current status of the pseudowires on the LSP.

9. The apparatus of claim 7 wherein said aggregated pseudowire status message comprises a list of pseudowires for which said aggregated pseudowire status session verifies said current status.

10. The apparatus of claim 7 wherein transmitting said aggregated pseudowire status message comprises transmitting said aggregated pseudowire status message at periodic intervals while said aggregated pseudowire status session is active.

11. The apparatus of claim 7 wherein said aggregated pseudowire status message comprises a session identifier and a refresh timer value.

12. The apparatus of claim 7 wherein said current status of the pseudowires on the LSP comprises a list of pseudowires added to or removed from the LSP.

13. A computer program product comprising logic encoded on one or more non-transitory computer readable media for execution and when executed by a processor operable to:

generate an aggregated pseudowire status message at a first network device in a Multi-Protocol Label Switching Transport Profile (MPLS-TP) network;

transmit said aggregated pseudowire status message to a second network device on a Label Switched Path (LSP) extending between the first and second network devices in the MPLS-TP network, said aggregated pseudowire status message configured to verify a current status of pseudowires on the LSP;

establish at the first network device, an aggregated pseudowire status session with the second network device upon receiving a response to said aggregated pseudowire status message on the LSP; and transmit an individual pseudowire status message on each of the pseudowires on the LSP, when said response is not received at the first network device within a predefined interval.

14. The computer program product of claim 13 configured such that while said aggregated pseudowire status session is active, said individual pseudowire status message is only transmitted once on said each of the pseudowires on the LSP following a change in the current status of the pseudowires on the LSP.

15. The computer program product of claim 13 wherein said aggregated pseudowire status session further comprises logic for updating said current status of the pseudowires on the LSP and transmitting another of said aggregated pseudowire status message after receiving said response.

* * * * *